(No Model.)
J. HUDSON.
WHEEL FOR VELOCIPEDES.
No. 339,422.        Patented Apr. 6, 1886.
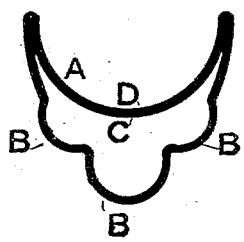
FIG.1
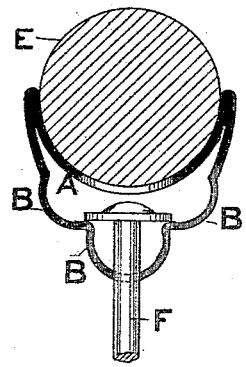
FIG.2
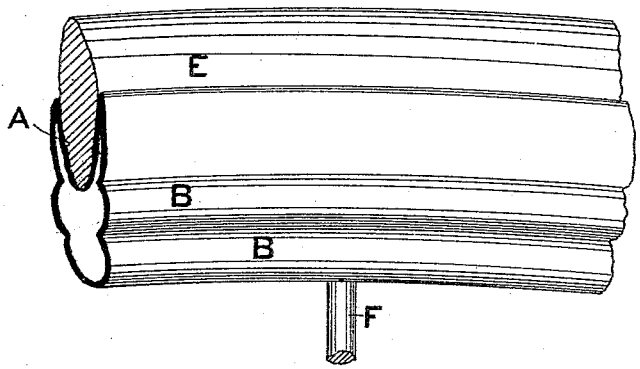
FIG.3
FIG.4
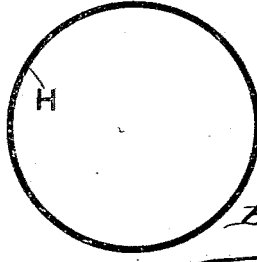
FIG.5
Witnesses.
N. R. McCready
Robert Everett
Inventor
James Hudson,
By James L. Norris.
Atty.

UNITED STATES PATENT OFFICE.

JAMES HUDSON, OF BIRMINGHAM, COUNTY OF WARWICK, ENGLAND.

WHEEL FOR VELOCIPEDES.

SPECIFICATION forming part of Letters Patent No. 339,422, dated April 6, 1886.

Application filed August 21, 1885. Serial No. 174,992. (No model.) Patented in England April 16, 1885, No. 4,675.

*To all whom it may concern:*

Be it known that I, JAMES HUDSON, a subject of the Queen of Great Britain, residing at Tennant Street, Birmingham, in the county of Warwick, England, manufacturer, have invented a new and useful improvement in the shape and construction of rims and tires of wheels for bicycles, tricycles, and other vehicles, (for which invention I have obtained provisional protection for a patent in Great Britain, No. 4,675, bearing date the 16th day of April, 1885,) of which the following is a specification, reference being had to the accompanying drawings.

Hitherto rims have been generally constructed of plain sheet steel or metal, and made to the shape that they are required by being drawn through suitable dies. In my improved rim, in making the tube of which it is afterward formed, I so arrange the dies or rolls through which the steel or metal is to pass that the tube is formed with longitudinal corrugations, which it is found add greatly to its strength, and at the same time much lighter steel or metal may with safety be employed. It will be understood that the joint, which, by preference, is soldered, may be formed on any desired part of the rim; but I usually form it in the groove of the rim, so that it is covered by the india-rubber tire.

Instead of drawing or rolling my improved rim from sheet-steel, as hereinbefore described, in some cases I use steel, iron, or other metal tubes.

I will now proceed to describe my invention by the aid of the accompanying drawings.

Similar letters of reference denote similar parts in each figure in which they occur.

Figure 1 is a cross-section of a corrugated tube constructed according to my invention. Fig. 2 is a cross-section of a wheel-tire made with corrugated tube constructed according to my invention, showing also the india-rubber tire and a spoke. Fig. 3 is a partial side elevation of the foregoing. Fig. 4 is a cross-section of a strip of metal from which the tube may be formed. Fig. 5 is a cross-section of a circular tube from which the corrugated tube may be formed.

A tube made according to my invention is concave and semicircular, or nearly so, on the top—that is, the outside when it is bent into a tire—and convex and of a shape generally semi-elliptical, but corrugated, on the under side. The concave part is shown at A, Figs. 1, 2, and 3, and the corrugations on the semi-elliptical part are shown at B B B in the same figures. In the drawings three corrugations are shown; but I do not confine myself to that exact number, nor to the exact shape shown. I make the joint of the tube (when the tube is formed from a strip of metal,) at C, and the brazing or soldering is at D, under the india-rubber tire E, which conceals and protects it. (See Figs. 1, 2, and 3.)

F, Figs. 2 and 3, is a spoke of the wheel.

In Fig. 4, G is the cross-section of a strip of metal to be drawn or rolled into a tube of the section at Fig. 1 or a similar one.

In Fig. 5, H is the cross section of a circular tube which is to be drawn through dies to form a tube of the section shown at Fig. 1 or a similar one.

I am aware that the wheel-rims have heretofore been made in tubular form, either from previously-prepared tubes or from strips of metal to which the desired form has been imparted. This, however, I do not claim, broadly; but, Having fully described my invention, what I desire to claim, and secure by Letters Patent, is—

A tubular wheel-rim provided with a circumferentially-grooved surface concaved and semicircular in cross-section, and having its under side convexed and formed with a series of longitudinal corrugations, in combination with a rubber tire set in the grooved periphery of said rim, as set forth.

JAMES HUDSON.

Witnesses:
   T. EMORY DAVIES,
      *Solicitor, Birmingham, England.*
   CHARLES JOHNSTONE,
      *his Clerk.*